(No Model.)
J. H. C. WATTS.
Galvanic-Battery Case.
No. 227,865.  Patented May 18, 1880.
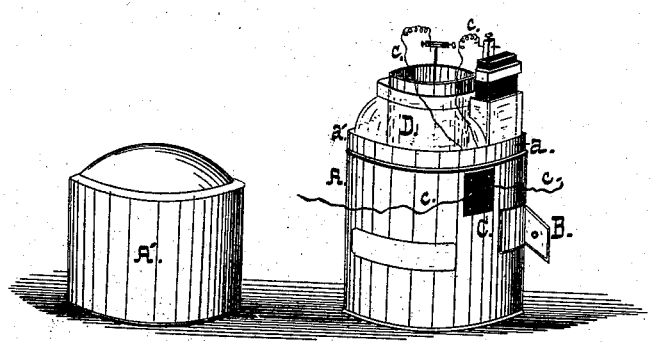
Witnesses,
W. A. Bertram.
L. H. Barclay.
Inventor,
J. H. C. WATTS
by
R. D. Williams.
Attorney.

UNITED STATES PATENT OFFICE.

J. HENRY C. WATTS, OF BALTIMORE, MARYLAND.

GALVANIC-BATTERY CASE.

SPECIFICATION forming part of Letters Patent No. 227,865, dated May 18, 1880.

Application filed March 18, 1880. (No model.)

*To all whom it may concern:*

Be it known that I, J. HENRY C. WATTS, of Baltimore city, State of Maryland, have invented certain new and useful Improvements in Electric-Battery Cases; and I hereby declare the same to be fully, clearly, and exactly described as follows, reference being had to the accompanying drawing, in which the device is illustrated in perspective.

My invention has for its object to provide a case for electric batteries which will prevent the annoyance and trouble which have arisen hitherto by reason of the breaking of the cells or the deliquescence or efflorescence of their contents. In these cases the contents of the cells were liable to destroy the carpet or stain the floor of the apartment in which the battery was placed.

I construct a casing adapted to fit the cell consisting of a metallic body, A, having a bead, $a'$, and collar $a$, (which may be provided with an elastic washer,) and a cover, A', adapted to fit closely thereon.

A perforated bracket, B, is soldered to the casing, whereby the same may be secured by nails or screws to the wall at a convenient height. A gutta-percha or equivalent insulator-plate, C, is secured to the side of the case, and is perforated for the passage of the wires $c\ c$ from the cell D.

Being inclosed practically air-tight, the entrance of dust into the cell and the efflorescence or deliquescence of its contents are prevented. Should the cell break, even, no particular harm is done, as it can readily be replaced in the casing by a new jar. The insulator C prevents the setting up of connection between the wires and incident cutting out of the battery.

What I claim is—

A casing for electric batteries consisting of the metallic body A and lid A', one of them being provided with the perforated insulator-plate C, as set forth.

J. HENRY C. WATTS.

Witnesses:
R. D. WILLIAMS,
JOHN C. GITTINGER.